June 3, 1930.　　　　　M. F. CARR　　　　　1,761,612
SEPARABLE SNAP FASTENER
Filed Dec. 8, 1928
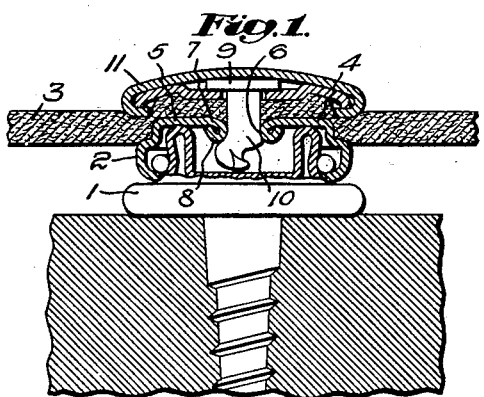
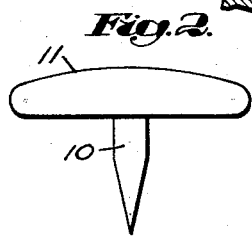
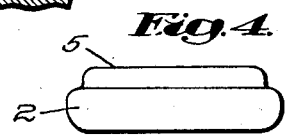
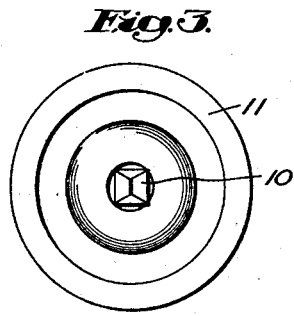
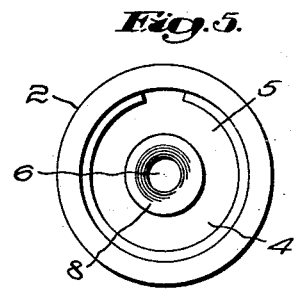
Inventor:
Moses F. Carr,
by Emery, Booth, Janney & Varney
Attys Patented June 3, 1930

1,761,612

UNITED STATES PATENT OFFICE

MOSES F. CARR, OF LEXINGTON, MASSACHUSETTS, ASSIGNOR TO UNITED-CARR FASTENER COMPANY, OF CAMBRIDGE, MASSACHUSETTS, A CORPORATION OF MASSACHUSETTS

SEPARABLE SNAP FASTENER

Application filed December 8, 1928. Serial No. 324,675.

My invention aims to provide improvements in separable snap fasteners.

In the drawings which illustrate a preferred embodiment of my invention:—

Figure 1 is a part section and part elevation of a snap fastener embodying my invention;

Fig. 2 is a side elevation of one form of attaching element for securing a snap fastener part to a carrying medium;

Fig. 3 is an end view of the attaching element shown in Fig. 2;

Fig. 4 is a side elevation of the socket shown in Fig. 1; and

Fig. 5 is a plan view of the socket shown in Fig. 4.

Referring to the embodiment of my invention illustrated by the drawings, I have shown a well known type of stud 1 and socket 2 and, therefore, I shall not attempt to describe in detail the stud 1 or the socket 2, except as is necessary for a clear understanding of my invention.

My invention relates more particularly to the manner of attaching a snap fastener element to a carrying medium, especially the type of fastener element which has a central depression, cavity or chamber.

In this application, I have shown my invention as it is employed in securing the socket 2 (Figs. 1, 4 and 5) to the flexible carrying medium 3. The socket shown has a central chamber 4 having a bottom portion 5 resting against one face of the carrying medium 3, as shown in Fig. 1. An aperture 6 is provided in the center of the bottom portion 5 and the metal surrounding the aperture tapers or curves toward the central chamber 4 to provide a wall 7 for guiding an attaching element into the aperture. The metal continues from the tapered or curved wall 7 and is rolled outwardly to provide a reinforcing portion 8.

While any suitable attaching member, which may be upset, may be used to secure the socket 2 to the carrying medium 3, I have shown a tack for this purpose. The tack, as illustrated in Figs. 1, 2 and 3, comprises a tack part having a head 9 and shank 10 and a two part cap 11 secured to the head 9 of the tack.

In Fig. 1, I have shown the shank 10 of the tack pressed through the carrying medium 3 and the aperture 6 with the end portion upset or riveted against the rolled reinforcing portion 8 of the socket 2. Thus, I have provided a strong, durable attachment whereby the fastener element may be secured to one or several thicknesses of material and the reinforcing means sets up a resistance against any tendency for the metal to yield or tear and permit accidental removal of the fastener element when subjected to stresses and strains.

While I have shown and described a particular type of snap fastener element secured by a tack, I wish to have it understood that a different fastener element may be attached in the same general manner by a tack or other suitable attaching element in combination with means for reinforcing the metal around the aperture 6 and, therefore, reference is made to the following claim to indicate the scope of my invention.

Claim.

A snap fastener assembly comprising, in combination, a carrying medium, a snap fastener part located at one side of the carrying medium and having a cup-shaped central chamber, said chamber having a bottom provided with an aperture surrounded by a reinforced wall portion, and an attaching tack having a head located at the opposite side of the carrying medium and providing a shank passing through the carrying medium and aperture in the said bottom of the fastener part and having its end upset against said reinforced wall portion thereby securing the snap fastener part to the carrying medium.

In testimony whereof, I have signed my name to this specification.

MOSES F. CARR.

CERTIFICATE OF CORRECTION.

Patent No. 1,761,612.     Granted June 3, 1930, to

MOSES F. CARR.

It is hereby certified that the assignee in the above numbered patent was erroneously described and specified as "United-Carr Fastener Company", whereas said assignee should have been described and specified as "United-Carr Fastener Corporation, of Cambridge, Massachusetts, a Corporation of Massachusetts", as shown by the records of assignments in this office; and that the said Letters Patent should be read with this correction therein that the same may conform to the record of the case in the Patent Office.

Signed and sealed this 5th day of August, A. D. 1930.

(Seal)

Wm. A. Kinnan,
Acting Commissioner of Patents.